Jan. 31, 1928.  
F. S. CROZIER  
1,657,566  
ART OF MAKING CONCRETE LUMBER AND OTHER CEMENTITIOUS ARTICLES  
Original Filed Jan. 2, 1926    5 Sheets-Sheet 1

INVENTOR.  
BY F. S. Crozier  
ATTORNEY.

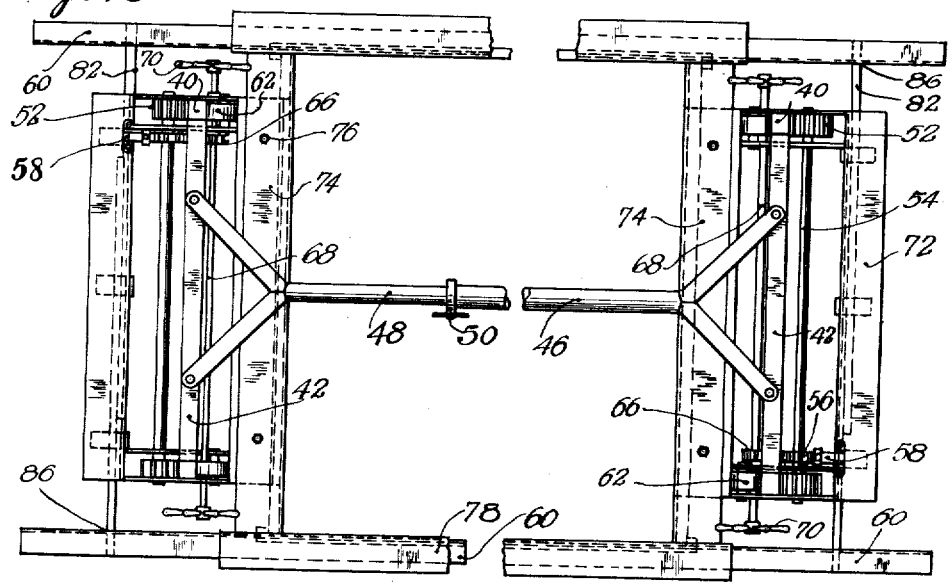

Jan. 31, 1928. 1,657,566
F. S. CROZIER
ART OF MAKING CONCRETE LUMBER AND OTHER CEMENTITIOUS ARTICLES
Original Filed Jan. 2, 1926  5 Sheets-Sheet 3
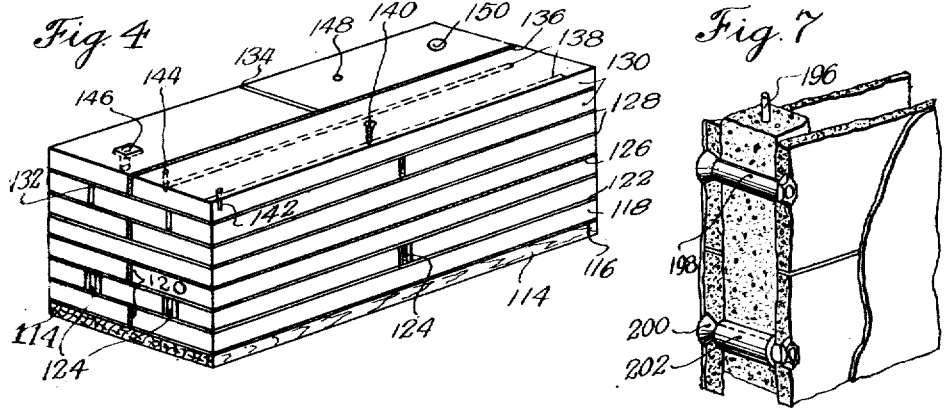
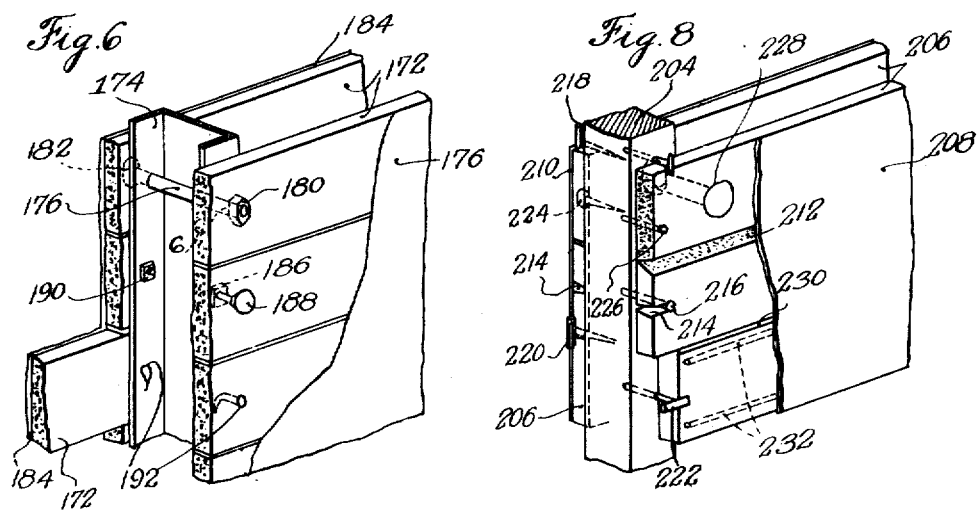
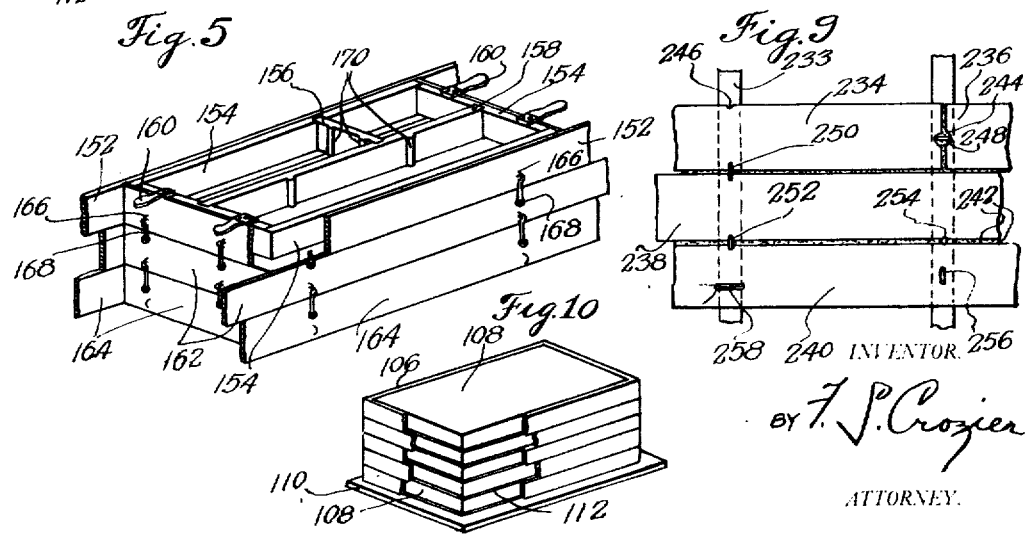

Jan. 31, 1928.
F. S. CROZIER
1,657,566
ART OF MAKING CONCRETE LUMBER AND OTHER CEMENTITIOUS ARTICLES
Original Filed Jan. 2, 1926   5 Sheets-Sheet 4
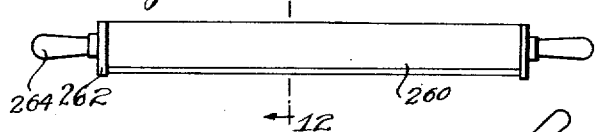
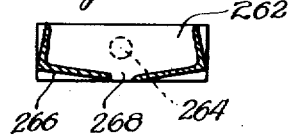
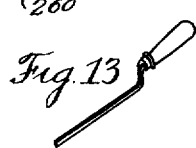
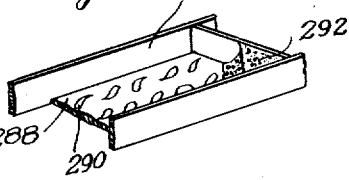
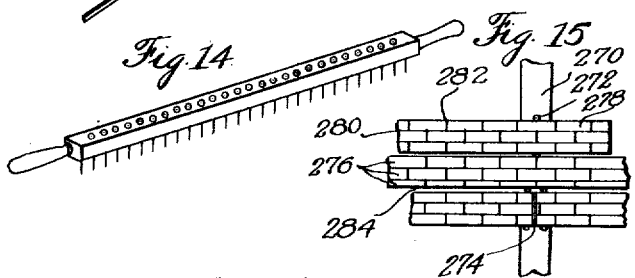
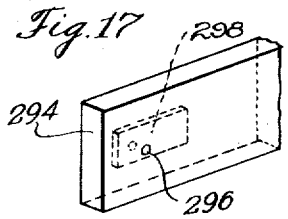
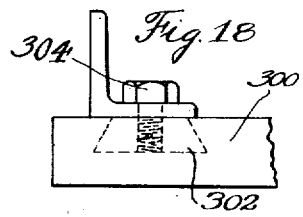
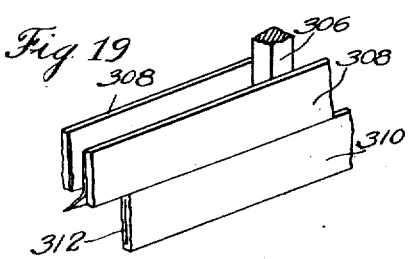
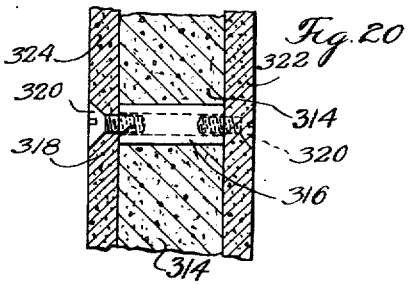
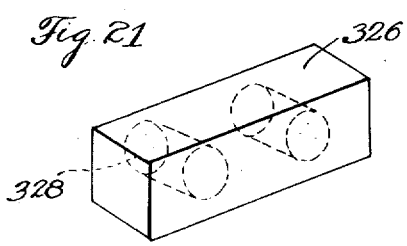
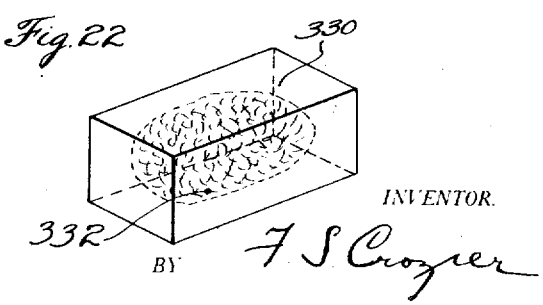
INVENTOR.
F. S. Crozier
BY
ATTORNEY.

Jan. 31, 1928.
F. S. CROZIER
1,657,566
ART OF MAKING CONCRETE LUMBER AND OTHER CEMENTITIOUS ARTICLES
Original Filed Jan. 2, 1926      5 Sheets-Sheet 5
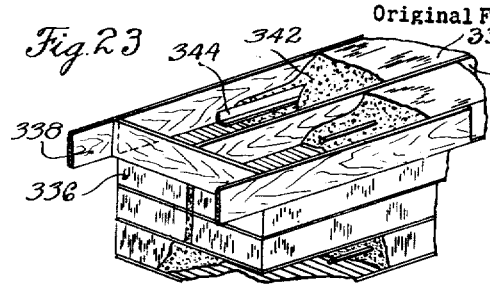
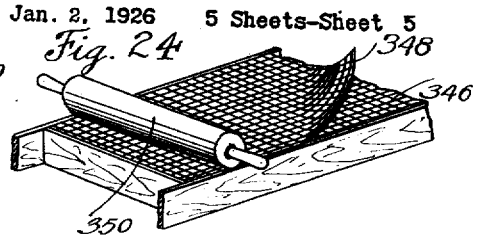
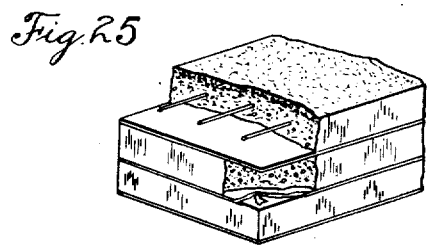
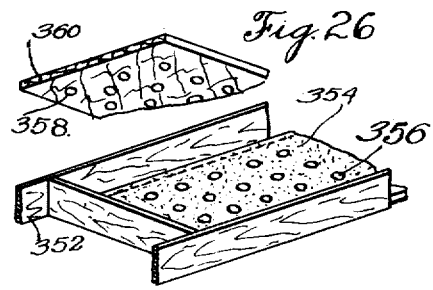
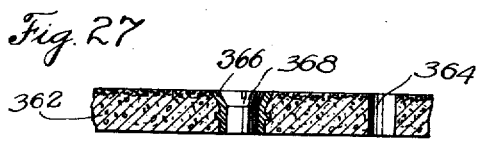
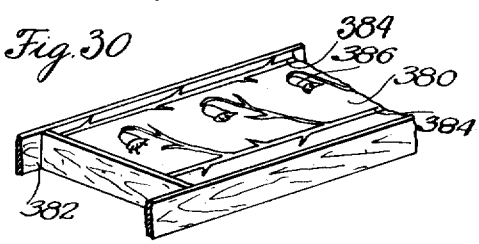
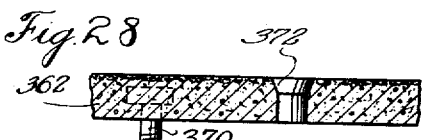
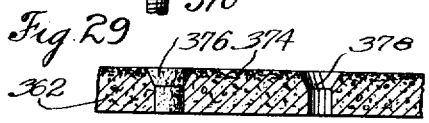
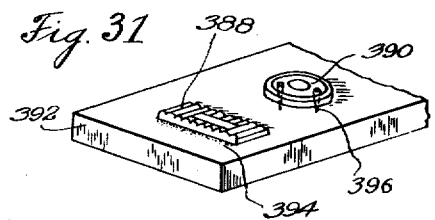
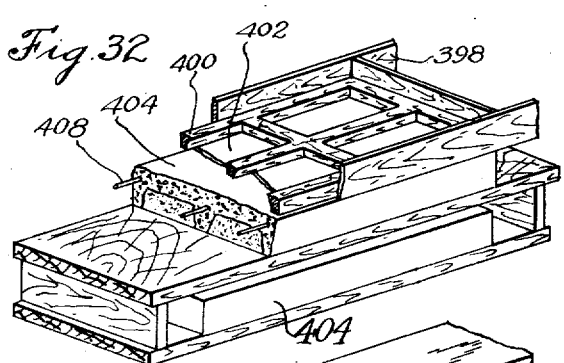
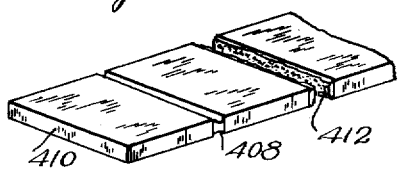
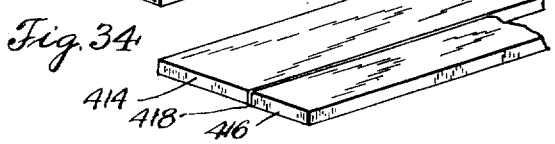
INVENTOR.
BY F. S. Crozier
ATTORNEY.

Patented Jan. 31, 1928.

1,657,566

UNITED STATES PATENT OFFICE.

FLORENCE S. CROZIER, OF NEW YORK, N. Y.

ART OF MAKING CONCRETE LUMBER AND OTHER CEMENTITIOUS ARTICLES.

Original application filed January 2, 1926, Serial No. 78,983. Divided and this application filed May 28, 1926. Serial No. 112,343.

This invention relates particularly to the manufacture of lumber and timber units of more or less standard sizes and shapes similar to wooden lumber and timber units but made of cement concrete or other cementitious mixture, for example boards, joists, studding, rafters, fence-posts, timbers etc., and other cementitious units and articles, and its chief object is to provide a process or method which will enable the manufacture of such cementitious units and articles of high quality and adaptability rapidly and economically and ready for convenient use.

This application is a division of my co-pending application Serial No. 78,983, filed January 2, 1926, and pertains to the process or method of using the apparatus disclosed in that application.

There is now in use no scientifically ideal base on which to spread stucco. Expanded metal, wood lath, wire mesh, burned brick and tile are all defective. Metal rusts. Stucco does not bond well on those surfaces. The expansion and contraction of the stucco and the base is different often causing cracks. Concrete stucco put on my concrete sheathing boards bonds perfectly therewith and both expand and contract together. They become one monolithic sheet, a fire proof overcoat on a frame house. It is ideal, concrete on concrete. It makes a frame house fire proof without increasing its cost; gives all of the benefits of expensive masonry homes at the low cost of frame homes.

An object of this invention is to produce concrete lumber units having special means for facilitating fastening the lumber units to or in a wall or structure, a very desirable thing, especially when non-nailable concrete lumber is used. It is less important when the lumber units are made of nailable concrete, for example, concrete in which coal cinders, slag, volcanic ash or coke and the like is used as the aggregate with the Portland cement.

Another object is to furnish practical means for economically and rapidly producing concrete boards and other units having special surfaces for improving the bond of stucco and plaster thereto or for ornamentation and architectural appearance or for resisting the elements, to the end that better and more beautiful buildings will be possible and the cost of repairs, painting, insurance, etc. be reduced.

Concrete lumber units and other articles must, depending on the quantity of cement used and the prevailing climate, usually remain undisturbed to set and harden one to four weeks before being used, so when a large output per day is made it takes an exceedingly large area of land to spread the product out on unless they are made one above the other from the ground or other support up and the concrete lumber or other units left in the pile undisturbed until set and hardened; and available land is scarce and costly in or near cities and on lots where houses are to be built. Therefore the best, if not the only commercially practical way is to make at least the concrete lumber units in vertical piles, preferably of a plurality of supported subdivided horizontal layers of plastic concrete one above the other, the layers being separated from each other by wooden, concrete or composition boards, or by sheet-metal, or by sand, preferably dry, or by fabric, paper or other means preferably covered or saturated with asphalt, wax, oil, tar or other means for making same less likely to be absorbed by or adhere to the concrete or admit water.

The method hereinafter described is specially intended or designed for making concrete lumber and other units in that way in piles of such separated concrete layers. To these and other ends the invention consists in the novel method hereinafter described for making the lumber units and articles.

Referring to the drawings, Figure 1 is a side view of the preferred type of my improved apparatus or machine used for manufacturing concrete lumber units and other articles by my improved method. Figure 2 is a top view and Figure 3 an end view of the same apparatus or machine shown in Figure 1.

Figs. 4, 10, 23, 25 and 32 illustrate piles of lumber made by my method.

Fig. 5 shows some auxiliary apparatus for making piles of lumber such for instance as shown in Fig. 4.

Figs. 6, 7, 8, 9 and 15 show my lumber incorporated in various types of walls.

Figs. 11, 12 and 13 show devices for cutting the lumber into smaller sizes, Fig. 12 being a cross-section on line 12—12 of Fig. 11.

Fig. 14 is a rake for roughening the surface of the lumber when desired.

Figs. 16, 24, 26, 30 and 31 show devices for forming ornamental designs in the surface of the lumber.

Figs. 17, 18, 19 and 20 show particular forms of reinforcement incorporated in my lumber.

Figs. 21 and 22 show devices for lessening the weight of the lumber units when desired.

Figs. 27, 28 and 29 show methods incorporating fastening devices in the lumber.

Fig. 33 shows the preferred method of cutting the concrete boards into smaller units after they are hardened.

Fig. 34 shows the method of making a large board from a plurality of smaller boards.

Figure 1:
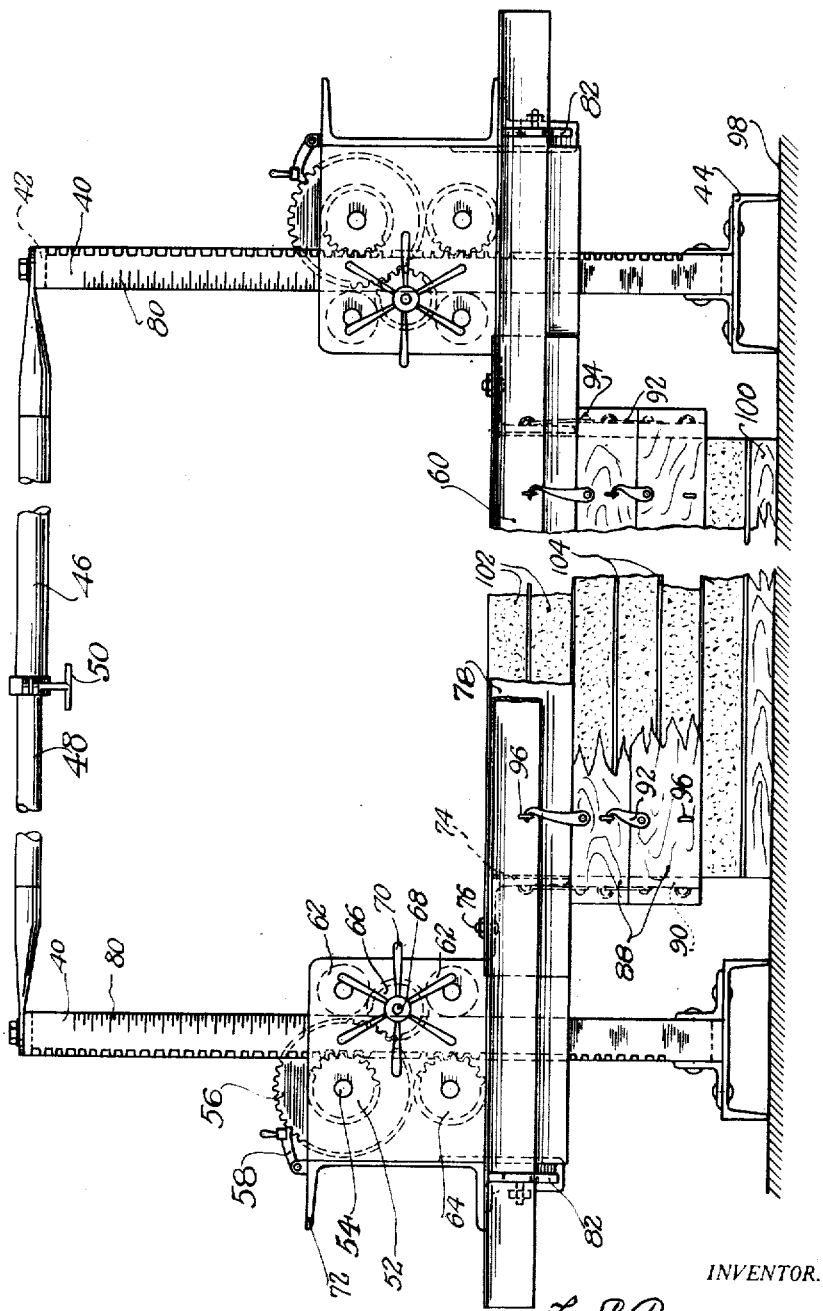

Examining more in detail Figs. 1, 2 and 3, the numeral 40 designates each of the four vertical racks that are the corner-posts of the machine, 42 the frame bar to which racks 40 are attached and which ties the two racks at one end together and to the shoe or base 44 at the bottom. 46 and 48 are two spacing and bracing pipes, one telescoped inside the other for adjusting purposes and held tight by setscrew 50, these tying the tops of the two end frame bars together to help keep racks 40 vertical. A brace (not shown) extending from top of each end bar on a slant to the ground preferably is also used. Pinion 52 is rigidly keyed to shaft 54, the pinion meshing with the teeth on rack 40, another pinion 52 being keyed to shaft 54 near its other end to mesh with the other rack of the pair of racks at one end of machine. Another shaft 54 and pinions 52 connect and operate on the two racks 40 at the other end of the machine. Each shaft 54 is provided with a spur driving gear 56 rigidly keyed to the shaft, stop dog 58 operating in the teeth on the circumference of gear 56 to lock the mechanism and hold it at any desired point in its vertical travel or after the container has been raised. Two idler rolls 62 operate on the back side of rack 40 to help keep rack 40 vertical and its teeth meshing with pinion 52 and idler pinion 64. Drive pinion 66 is rigidly keyed to drive shaft 68 on each end of which shaft is rigidly keyed a hand-wheel 70, the said pinion meshing with the teeth of spur gear 56 on shaft 54.

Bearings for shafts 54 and 68 are furnished by the two housing boxes that enclose the pinions and rollers, which boxes are tied together by channel 72 to which they are rigidly fastened, making a self-sustaining mechanical structure having free and accurate vertical movement and to which is attached vertical end wall 74 of the container and an apron attached by bolts 76, and to which structure is removably attached the two vertical side walls 60 of the container and which preferably carry removable apron 78. Preferably on or near each corner-post is a vertical measuring scale 80 to quickly indicate the inches or fractions thereof that the container is raised or lowered, so both ends may be moved to the same extent each time by the two operators, one at one end and one at the other end of the machine.

At each end of the machine are two slide bars 82 side by side slidably resting just below channel 72 in housings suspended from channel 72, such housings being provided with set-screws 84 for cinching the slide bars at any desired adjustment point. Near an end of each slide bar is a vertical slot 86 extending down from its top part way, in which slot slidably rests the vertical web of the angle walls 60 which with its removable apron 78 comprises a vertical side wall of the container chamber of the machine. By moving the slide bars on either side of the machine out or in and providing removable end wall aprons of different desired lengths the chamber of the container can easily and quickly be adjusted to make concrete layers of any desired horizontal width; and by setting the two pairs of end posts closer together or farther apart, which would cause the sides 60 of the container to slide through slots 86 in slide bars 82 and the pipes 46 and 48 to lengthen or shorten as desired, it will be possible to make a concrete layer of any desired length in the container. This ready adjustability is of great practical and economic value in the art of making concrete lumber units, units necessarily of various standard widths, lengths and thicknesses.

Turning hand wheel 70 rotates shaft 68 and its pinion 66 which turns spur gear 56 to rotate shaft 54 and its two pinions 52 in unison, and as said pinions respectively mesh with the teeth on its rack, when said pinions are so turned the structure at that end of the machine must move vertically evenly, up or down as the case may be on the two end racks, carrying with it one end of the container and its burden. Another man, preferably at the same time, similarly operates the mechanism at the other end of the machine. However, when side member 60 is attached with but one bearing point at each end thereof, as slot 86, it is practicable to raise first one end of the container and then the other, to the moderate extent usually required, without undue strain.

In order that the sides and ends of the concrete layers in the pile of layers may be longer protected against lateral displacement of the unset concrete pending its stabilization or setting to make it self-sustaining without lateral support, I preferably provide one or more detachable or removable extensions 88 and 90 for the side and end vertical walls of the container, and which when raised help trowel the edges of the layers and can be left on pile while necessary. Preferably these extensions are attached to the container and carried by hooks 92 turnably anchored to the extension by bolt 94 or otherwise, the hook being hooked into staple or eyelet 96 on the container; the next extension, as the container is raised and the pile of layers increases in height, is similarly attached to the first extension. By suitably supporting or bracing these extensions to keep them in place, and unhooked them from the container, the latter can be raised independent of the extensions high enough to clear the pile, so the entire machine can be dragged sidewise and removed without disturbing the pile of unset concrete layers or units and the work of building another similar pile near the first pile can go on at once. This keeps the machine busy and enables rapid production in large quantity at low cost.

In Fig. 1 the side of part of a pile of my concrete boards or other lumber units is shown in the making. 98 is the ground, 100 a support for the pile of concrete lumber, 102 the unset concrete boards or other units and 104 the paper or other means between the layers for keeping the layers from bonding together or touching each other until they are set.

Layers of concrete and paper are added alternately one above the other until a pile of the desired height is secured, as may be readily understood by referring to Figs. 4, 5 and 10 in which the layers and forms may be seen independent of the apparatus above described.

Fig. 10 is a crude form of my apparatus that I use in some cases for making certain concrete products by my method. Preferably it consists of a plurality of removable frames 106, one above the other and surrounding a pile of a plurality of plastic concrete layers or units 108 resting on support 110, the layers or units being separated from each other by paper or other means 112. As shown part of each frame is broken away to show the layers or products inside. Preferably each frame in openable and adjustable, by means not shown, and is preferably of same height as the vertical thickness of the concrete layer or article to be made therein.

Fig. 4 is a pile of hardened concrete lumber units; mostly boards, made by my improved method, 114 being the base or support on which the pile was made and rests, and 116 a layer of sand or other suitable inert material on which the bottom concrete layer preferably is made; but, when desired, support 114 can be dispensed with and the pile rest on the ground or a floor. 118 is one of two hardened concrete boards, say one inch thick, comprising the bottom layer of the pile, which layer was sub-divided while plastic by cutting the layer in two and filling the "cut" or space between the edges of the two boards with dry sand or other inert material or means 120 that will keep such boards apart until hardened. Being made of cinder concrete or other concrete of a kind into or through which nails can be driven after the concrete is set and hardened, the board 118 is provided with no fastener holes or other special fastener means, and, used as a sheathing board, it can be nailed to the wooden studding of a frame house, or to the joist or rafters, the same as if it was a wooden board, the edges and ends of the boards comprising the concrete sheathing being preferably united together with concrete mortar or other cementitious mixture so as to form one large monlithic sheet to protect against fire and weather. 122 is a sheet of paper, felt, fabric, composition or other separating element, preferably waxed, oiled or treated with asphalt, tar or other means for making it water proof or less likely to adhere to the hardened concrete products, and the second plastic concrete layer is formed thereon after it is put above the first layer. 124 are partitions that subdivide the second concrete layer of the pile into a plurality of concrete lumber units, the two lengthwise partitions, each of a vertical height of say one inch (the thickness of the layer), were inserted in place in the container with their lower edges on the paper or other layer-separating means preferably before the concrete was put into the container to form such subdivided concrete layer; the cross-subdividing partition 124 was inserted preferably after the concrete layer was formed and before it was much set or hardened by being pushed down into the concrete to subdivide the layer into still smaller units; all these partitions 124 were left in place in the subdivided plastic concrete layer until the concrete of the layer was set and hardened, and then they were removed and used over again. 126 is a specially thick layer of dry sand or substituted inert material between two plastic concrete layers, used to keep the layers apart and to facilitate by absorption and drainage the removal of excess water from the adjacent sloppy wet concrete layers and thereafter to return to the setting concrete its stored up moisture while the concrete is hardening. The fourth concrete layer of the pile is left full size and not subdivided. 128 are sheets of metal, preferably galvanized, or of some other thing suitable for keeping the concrete layers apart. 130 are the top two less sloppy wet concrete layers of the pile, each subdivided; and between said layers is a wooden board that keeps them apart. 132 is one of the two vertical spaces left between the subdivisions of the concrete layer when the subdividing partitions were withdrawn preferably before the stabilized concrete became much hardened, which spaces were left open and not filled with anything; and 134 is a similar open or unfilled "cut" or space between two units, while 136 is such a space filled with sand or substituted material. 138 are metal reinforcing elements imbedded in and covered by the concrete of which the board or other unit was made. 140 is a fastener hole in the board made by imbedding in the concrete while plastic a screw or other threaded element that preferably is left in until the concrete is at least partly set and hardened and then removed to leave a fastener hole. 142 is a nail or rivet or the like, preferably with a "head" that is inserted in the plastic concrete and later was removed as was 140 to leave a fastener hole. 144 is a fastener hole that was made in the plastic concrete by inserting and withdrawing a nail, screw, rivet, bolt, punch or other hole-forming means and filling the hole with sand or substituted material or means for keeping the hole from closing or becoming distorted, or filled with concrete. 146 is a nut or other threaded fastener element or means that is at least partly imbedded in a surface of a concrete board or other lumber unit or article while the concrete was not much if any set or hardened and left in permanently, to aid or facilitate attaching the unit or article by threaded means to or in a wall or structure or to another unit or article. 148 is a fastener hole made by inserting a cylindrical metal element in the plastic concrete unit, that is to remain in the product permanently to metal-line the hole. 150 is a fastener hole for a bolt or other fastener element having a head that is to be at least partly counter-sunk in the concrete unit or article.

Fig. 5 shows one of the improved methods I employ in maknig concrete units of certain kinds, with my apparatus or machine. 152 is the container, 154 a removable frame support for partitions 156 and 158, and 160 are handles rigidly attached to the frame but not attached to the container. Frame 154 is positioned inside of container 152, the tops of frame, container and partitions preferably being even with each other. Partitions 156 and 158 are preferably rigidly and permanently attached to frame 154, the weight of frame 154 and partitions 156 and 158 being carried by container 152 on the top edge of which handles 160 rest, so that by raising container 152, frame 154 and partitions 156 and 158 are also raised, and can likewise be lowered. Preferably the vertical height of the partitions is the same as the thickness of the concrete layer or article being made, their lower edges resting on the paper or other means on which the concrete layer is to be made by filling the spaces in the contanier between the partitions and frame with concrete. When the subdivided layer is completed container 152 is raised and with it frame 154 until partitions 156 and 158 are out of contact with the concrete of the layer; then frame 154 and its partitions 156 and 158 are lifted off from container 152 by handles 160. The cracks or open spaces left by removing frame 154 and partitions 156 and 158 are filled with dry sand or substituted means for preventing the concrete from sagging or filling such spaces. The concrete layer so supported and protected is then covered with paper or other means for supporting the next concrete layer to be built above the first and to prevent its contact with the layer just completed. Frame 154 and its partitions 156 and 158 are put back in the container 152 and lowered until partitions 156 and 158 touch the layer-separating paper or means, then the operation is repeated. The sand or substituted means filling the space left by removal of frame 154 is kept in place by the walls of container 152 and its extensions 162 and 164 which are held in place by hooks 166 and 168. The projections 170 on partitions 156 and 158 make notches or depressions in the edges and ends of the concrete boards or other units or articles for the accommodation of fasteners and for other purposes. By using a partition of suitable shape the edges of the concrete board or article can easily be given a pleated, sawtooth or other desired form.

Fig. 6 is a cross-sectional view of a wall built of my concrete sheathing boards 172 attached by metal fasteners to steel channel studding or uprights 174, stucco being put on the outer concrete boards and plaster on the inner concrete boards, the edges of the concrete boards preferably being cemented together with concrete or other cementitious mixture. Several kinds of fastener means for attaching the concrete boards to the steel studding, joist or rafters are shown. 176 is a bolt that extends through fastener hole 178 in each of the two opposite concrete boards, one in the outer and the other in the inner sheathing course, and through two holes punched or drilled through the two webs of channel 174, 180 is a threaded nut on bolt 176 preferably at least partly counter-sunk in hole 178, and 182 is the head of bolt 176 shown counter-sunk in board 172 and covered with plaster 184. 186, 188 and 190 shows short fastener bolts that extend only through the concrete board and one web of steel channel 174 and their threaded nuts. There is no chance for moisture to follow these bolts through the wall and these fasteners are more adaptable for varying needs. 192 is still another fastener, that is cinched in place or held by clenching or bending one end as shown or otherwise. In some cases I use a wire fastener that is threaded through a hole or notch in the concrete unit or put between two units to help attach the unit to or in a structure or to another unit or article.

Fig. 7 is largely the same as Fig. 6 except that reinforced concrete studding 194 containing element 196 is used in place of steel channel. Bolt 198 goes through a premade hole in the concrete studding or other unit, and bolt 200 goes through metallic cylinder or pipe 202 that is embedded in and forms a hole through the concrete stud or unit.

Fig. 8 is a cross-section view of a wall for a frame building having wooden studding 204 to the two opposite sides of which is nailed, screwed or otherwise fastened a plurality of concrete boards 206 to form an inner and outer fire proof concrete sheathing to protect the structure and contents and the wooden frame-work or studs against fire, weather, insects, rats, heat and cold, to increase the strength and durability of the wall and when desired be an ideal base for stucco 208 and plaster coat 210; and with some variations as to details floors, ceilings, roofs and partitions can be made of these concrete boards entirely or in part largely in the same manner. In some cases I bevel the face, or the edges or ends of the concrete boards while plastic, say as at 212, to make it more certain that water will run outwardly or to better enable stucco or other cementing agent to get in between the boards edges or ends to cement them together, and for architectural appearance. In some cases I slot the end or edge of a board as at 214 for fasteners 216 so it will be easier to adjust board in wall. Fasteners 218, 220 and 222 can be used when the boards or units are made of concrete that is not nailable and no fastener holes have been made therein. 224 and 226 are ordinary wire nails, spikes or other driven fasteners or screws inserted in premade fastener holes in the concrete boards and then driven or screwed into the wooden stubbing, joist, rafter or other wooden unit. 228 is a bolt or other metal fastener that connects or ties the two concrete board sheathing walls together, preferably without going through and weakening the stubbing. 230 is a joint without mortar. 232 is metal reinforcing which sometimes it is wise to imbed in the concrete board or a thick concrete plank such as preferably comprise the lowest or bottom course of the concrete board sheathing, and which may so largely carry the weight of the concrete boards above and must prevent any settling that might cause cracks in the sheathing or the stucco or plaster thereon and let moisture in. This precaution is advisable especially when the foundation on which the building rests is piers or posts, not solid masonry. Preferably the weight of the concrete board sheathing is on the foundation and not on the nails or fasteners, but it safely can be largely carried on the studding and other frame elements when steel or reinforced concrete studs or frame are used, through use of suitable attaching bolts or fasteners.

Fig. 9 is a face view of part of a wall made of vertical wooden studding 233 to which is attached a sheathing composed of a plurality of my improved concrete boards 234, 236, 238 and 240 united together with the aid of concrete or other cementitious mortar 242. Board 234 has a notch or depression (244 and 246) on each of its two edges and in its end, so fasteners can be used to help attach the board to the structure without having holes through the board and to enable the ends and edges of the boards to be in contact with each other, or to enable use of a thin mortar-joint. Fasteners 248 and 250 are in such notches and each has a "head" that preferably extends beyond the notch to clasp or cinch and better secure the board in place, or it may be at least partly countersunk in the notch. 252 and 254 are fasteners with "heads", to be driven, screwed or otherwise inserted between the edges or ends of two adjoining concrete boards or other units or articles that do not have fastener holes, notches or other fastener means in them, so as to secure such boards, units or articles to or in a wall or structure or to another unit or article, the "heads" preferably extending over and securely clasping or cinching the ends or edges of such boards, units or articles. In these cases the space between the two adjoining boards will be wider and mortar joint 242 thicker. 256 is a vertical slot and 258 a horizontal slot in board 240, allowing some adjustability for the fasteners that go in such slots.

Figs. 11 and 12 show a slotted guide for a knife or other tool or means used to cut or subdivide a plastic concrete layer while in the container of my apparatus or machine into a plurality of boards or other units or articles and for other purposes, 260 being the angle-irons of which preferably the guide is made, 262 the ends which rigidly tie the angle-irons together, 264 the handles, 266 the slant of the bottoms of angle-irons set so only their front or slot edge will touch the concrete (to avoid "mussing up" or disfiguration of the face of the concrete layer), and 268 is the slot that guides the knife etc. Fig. 13 is one kind of tool used with the device in Figs. 11 and 12. Fig. 14 is a rake, preferably made (as shown) by driving a lot of nails through a wood strip, used to groove or roughen surface of my concrete boards or other units so stucco or plaster will more readily and securely bond together and for other purposes.

Fig. 15 is a face view of part of a wall built of studding 270, to which is secured by fasteners 272 and 274 my concrete boards 276 and 278, the face of each board being grooved or otherwise marked (as by marks 280 and 282), so that when the boards are put together in a wall the wall will resemble or look like part of the face of a brick, tile, stone or other masonry wall, mortar 284 being preferably put between the edges of the boards.

Fig. 16 illustrates one or my improved methods of making boards and other concrete lumber units and articles having an ornamental face or a face ornamented, whereby the exterior of frame and other buildings, built preferably at least in part of my concrete lumber, may be ornamented and beautified in a great variety of ways at a relatively nominal cost, and the interior of buildings also; and the variety will be still further multiplied by using a different color or shade of color of concrete, or concrete made of any one or more of many different available aggregates, in making the concrete of which at least the ornamental face of the product is formed. 286 is the container in which the ornamental boards or units are made, and 288 is the pattern, metal sheet or other substance or fabric having on its face or in its weave an ornamental pattern or a design 290, stamped, carved, molded, pressed, sculptured or otherwise made thereon; and 292 is the concrete put in the container upon the face of such ornamental pattern or design to form the ornamented concrete units or articles. Ornamental stamped sheet metal so commonly used for ceilings, cornices, interior wall decorations, and picture frame moldings and many other highly ornamental and artistic things, having a face in relief or fashioned with classical or other designs or patterns are available at a relatively nominal cost for my use over and over for this purpose, thus transferring their ornamental designs or reproducing them with slight expense on the face of my inexpensive concrete stone boards that will endure forever uninjured by the ravages of time or the elements. They will not rust like iron will, nor require repainting or repair. Preferably I cover the upturned ornamental face of the pattern or design when it is laid in the container with the cementitious mixture of the desired character and color and of about the consistancy of whipped cream, working the same to remove the pocketed air bubbles therefrom and to fill with the mixture all of the nooks and parts of the ornamental design or pattern; and then I put on such facing enough concrete to fill the container and complete the concrete board or other lumber unit or article, and when desired I provide the product with fastener means by one of my several methods herein elsewhere described; the product being left on such pattern support until it is at least partly set and hardened.

Fig. 17 is part of a concrete board or other lumber unit 294, having a fastener hole 296 that goes through both the unit and the metallic reinforcing element 298 that is imbedded in the unit, making a stronger fastener means.

Fig. 18 is a concrete board or other lumber unit or article 300, in a face of which is permanently imbedded or held a nut or other threaded metallic fastener element 302, 304 being a threaded bolt, screw or other thing that is put through the object or unit to which the board, unit or article is to be attached (as shown here, a web of a channel iron studding) and its threaded end screwed into said nut or other fastener element 302 that is imbedded or held in the concrete board, unit or article.

Fig. 19 is part of a wall having a stud 306, to each side of which is secured concrete boards 308 and 310, boards 308 having on their inner surface permanently secured thereto asphalted, oiled or waxed paper or other means for keeping moisture, cold, heat or sound from at least so readily going through such boards, and 312 is a sheet of such paper or other means for the same purpose imbedded in concrete board 310.

Fig. 20 is a cross-section of a wall having a reinforced concrete studding 314 containing a section of pipe or other round hollow element 316 threaded on its inner surface 318 and preferably extending through stud 314, fastener screws or threaded bolts 320 being inserted through fastener holes in concrete boards 320 and 322 and screwed into the threads on the inner surface of said pipe 316 to secure the boards to stud 314. Fig. 21 is a board or other lumber unit 326, of some size and thickness made lighter by imbedding in the concrete thereof pasteboard hollow rolls or tubes or space-filling means 328. Fig. 22 is a similar unit 330, made lighter by imbedding in the concrete of which it is made lumps of coke, cinders, or other light or lightening material or means 332.

Fig. 23 shows a method of putting reinforcing rods or means into my reinforced concrete boards and other lumber units 334 and 336 while in container 338, that is divided by partition 340. The container is first partly filled with concrete 342 to form the lower part of the layer, on which the reinforcing elements 344 are laid in the desired positions, the balance of the container being then filled with concrete to imbed the reinforcing elements and complete the layer and boards or units, which are left to harden.

Fig. 24 shows my method of ornamenting my concrete or other lumber units 346 by pressing into the plastic surface thereof while in the container a wire mesh 348 or other fabric, pattern, design or other means for ornamenting, with the aid of roller 350 or other pressing means, then stripping off or removing such mesh, fabric or other ornamenting means, preferably at once, suitably protecting the ornamented face against soil or disfigurement and let product set and harden. Fig. 25 shows a pile of my concrete boards each having a special face that has been ornamented with a top layer of concrete of a different kind or color than the balance of the concrete of the board. Fig. 26 shows how I make my ornamental boards or other lumber units by putting in container 352 a layer of moist sand 354 and pressing into the sand surface an ornamental design 356 made by pressing on the sand and then removing ornamental face 358 of pattern 360, then covering the impressed sand layer with soupy-wet concrete of the desired kind and color and on this put concrete that preferably is not so wet to fill the container and complete the unit.

Fig. 27 is a cross section view showing one of my ways of making fastener holes through my concrete boards or other lumber units 362. Hole 364 is simply punched and left open. The other hole is permanently metal-lined, made by inserting cylindrical element 366 in which is metallic element 368 that preferably is not removed until after the concrete has at least partly set and hardened. Fig. 28 is a cross-section of my concrete board or other lumber unit 362, in the concrete of which is permanently imbedded one end of a metallic fastener element 370 to facilitate attaching the unit in a wall or to another unit or article, the other hole, 372, being designed to accommodate and at least partly counter-sink the head or nut of a bolt or other fastener. Fig. 29 is a cross-section of one of my concrete boards or other lumber units 362 having a special water-proof facing 374 and two fastener holes, 376 and 378, just made in the unset plastic concrete, hole 3 being filled with dry sand or substituted material to keep it from being distorted before the concrete is set, then being removed, and the other hole, 378, is left filled by the rivet or other means used to punch the fastener hole through the plastic concrete, which means preferably is removed after the concrete unit has at least partly set and hardened leaving a fastener hole of the desired shape and size at the correct predetermined spot.

Fig. 30 shows another of my improved methods for making an ornamental concrete board or other lumber unit 380 in container 382 by carving, sculpturing or otherwise forming or fashioning a face thereof while plastic or at least not fully set or hardened, with the desired ornamental designs 384 and 386 or other ornamentation, in relief or otherwise, then protecting said ornamented face against blemish until hardened. Fig. 31 shows how I attach applied ornaments 388 and 390 to my hardened concrete board or other lumber unit 392, 388 being cemented on with cementitious mortar 394 which makes a monolithic union, and 390 is attached by the aid of fasteners 396.

Fig. 32 shows my preferred method of making concrete sidewalk, floor or roof boards or plates with my improved apparatus or machine. 398 is the container, 400 a wooden or metal pattern frame, 402 a wooden or other support for the plate that is to be made, a plate like 404. First the spaces within the frame are packed full to the top of the frame with moist sand 406, then frame 400 is removed and the spaces left by its removal filled with wet "mix" concrete. Enough additional concrete is then put in and leveled off to cover the first concrete and the sand but preferably not enough to fill the container 398, and on this concrete (when plate is to be reinforced) reinforcing element 408 is laid in proper position. Then sufficient additional concrete 404 is put in the container to fill it and cover and imbed the reinforcing element and complete the plate. The top of the board or plate then is given any desired finish or marking and protected against blemish until hardened, then, freed of the sand, it can be marketed. Other shaped plates for walks, floors roofs can also be made.

Fig. 33 shows my preferred way of cutting my concrete boards and other lumber units after they have hardened. Groove 408 is made in unit 410 with a tool or emery or carborundum wheel, so the unit will break straight, as at 412. Some kinds of my concrete lumber units can be sawed if not too old or hard, or drilled to make fastener holes; but the best and cheapest way is to cut the units to final size and shape while the concrete is plastic or at least not much set. Fig. 34 shows my preferred method of making a large concrete board or other lumber unit of two or more smaller boards, as 414 and 416, or other concrete lumber units by joining them together monolithically by cement 418, preferably without the aid of metal fasteners.

The preferred way of practicing my herein claimed method is to form one at a time one or more relatively thin preferably horizontal unset plastic cementitious layers made preferably of what is commonly known as ordinary standard "wet mix" Portland cement concrete, each layer preferably being of approximately the same thickness as a standard wooden board or other lumber unit, for example a board one inch thick, and of sufficient length and width to make one or more cementitious boards or other lumber units of the desired length and width, subdividing the layer preferably when made into units of the desired size, shape and character when subdividing is desired, preferably making or placing the layers one above the other separated by wooden, concrete or composition boards or metallic plates or sheets or dry means that will not be absorbed by or adhere to concrete or by other suitable means for keeping the layers apart and preferably also for supporting the layer to be made thereon, subdividing a layer when necessary or desired and preferably when made and keeping the subdivisions from bonding together or touching each other until at least partly set by suitable means between the subdivisions removing the container or form preferably vertically and preferably without moving the layers and preferably before the cementitious layers or their subdivided units have attained their maximum hardness leaving the layers or their subdivided units on a supporting means to set and harden so they can be handled.

I have found that a horizontal layer even as thin as a wooden board when made of a very wet or saturated mixture can be quickly stabilized or "densified" and made self-sustaining without lateral support before it is set or hardened, so the container or form usually can be removed before the concrete or other cementitious layer has begun to set and certainly before it is much set or hardened, whereas a thicker layer of the same mixture would sag out of shape if removed that soon and must be left in the container or form much longer, delaying the manufacture and increasing the cost of the product and requiring more equipment and a larger investment. A much higher pile of separated horizontal cementitious layers resting on each other with their lateral confining means removed before the layers have set or hardened can be made of layers of about the thickness of a wooden board or other lumber unit than would be possible if the layers are thicker. And when I facilitate such stabilization or "densification" of the layers by compacting the cementitious mixture thereof to eliminate excess water therefrom and also air and bring the cement coated particles of the mixture closer together, and when cinders or other cellular aggregate particles are used to force the air out and water into the cells of such particles, preferably by pressure or by "working" or manipulating the concrete or other plastic mixture of the layer while in the container or form or otherwise, I get new important results of distinct value, one of which is to store up throughout the product in the cells of the aggregate particles extra water needed to more thoroughly hydrate adjacent cement, such water being fed out gradually as needed for a long time, thereby increasing the set and the efficiency of the cement, the most costly ingredient, enabling reduction of the amount used to make products of the same strength and density. And in a layer as thin as a board or other lumber unit more water can be left in the saturated mixture without keeping the container or form on the layer than would be possible if the layer was thicker, and that insures more perfect hydration of the cement and a better product.

My method also readily produces concrete lumber strips of the desired size, shape, color, form, texture, finish, preferably with a face resembling painted wooden strips, or other units for ornamenting walls or other structures or for subdividing stucco or other surface coats and for other uses.

I claim:

1. The method of making concrete lumber units, comprising forming in a bottomless mold a layer of plastic concrete, covering the top of said layer with non-adhesive material, raising the mold a distance not greater than the thickness of said layer plus said material, and then forming a new layer within said mold and supported by said original layer.

2. The method of making concrete lumber units, comprising forming in a bottomless mold a layer of plastic concrete, covering the top of said layer with non-absorbent material, raising the mold a distance not greater than the thickness of said layer plus said material, and then forming a new layer within said mold and supported by said original layer.

3. The invention set forth in claim 40 in which the mold is raised and the new layer formed before the original layer has set.

4. The method of making concrete lumber units comprising forming in a bottomless mold a layer of plastic concrete, covering the top of said layer with non-adhesive material, raising the mold before said layer has set a distance not greater than the thickness of said layer plus said material, whereby the rising mold trowels the edges of said layer, and then forming a new layer within said mold and supported by said original layer.

5. The method of making concrete lumber units comprising forming in a bottomless mold a layer of plastic concrete, covering the top of said layer with non-adhesive material, raising the mold before said layer has set a distance not greater than the thickness of said layer plus said material, whereby the rising mold trowels the edges of said layer, then forming a new layer within said mold and supported by said original layer, and adding supplemental walls to the bottom of said mold whereby the edges of said original layer are supported while setting.

6. The method of making concrete lumber units comprising forming in a bottomless mold a layer of plastic concrete, covering the top of said layer with non-adhesive material, raising the mold before said layer has set a distance not greater than the thickness of said layer plus said material, whereby the rising mold trowels the edges of said layer, then forming a new layer within said mold and supported by said original layer, adding supplemental walls to the bottom of said mold whereby the edges of said original layer are supported while setting, and in like manner adding additional layers and supplemental walls, whereby said walls trowel and support the edges of the newly formed layers.

7. The method of making concrete lumber units comprising forming in a bottomless mold a layer of plastic concrete, covering the top of said layer with non-adhesive material, raising the mold before said layer has set a distance not greater than the thickness of said layer plus said material, whereby the rising mold trowels the edges of said layer, then forming a new layer within said mold and supported by said original layer, adding supplemental walls to the bottom of said mold whereby the edges of said original layer are supported while setting, and in like manner adding additional layers and supplemental walls, whereby said walls support the edges of the newly formed layers.

8. The method of making ornamental concrete lumber units comprising forming in a bottomless mold a layer of plastic concrete, forming an ornamental face on the surface of said layer, covering the top of said layer with non-adhesive material, raising the mold a distance not greater than the thickness of said layer plus said material, and then forming a new ornamented layer within said mold and supported by said original layer.

9. The method of making ornamental concrete lumber units comprising forming in a bottomless mold a layer of plastic concrete, forming an ornamental face on the surface of said layer, covering the top of said layer with non-absorbent material, raising the mold a distance not greater than the thickness of said layer plus said material, and then forming a new ornamented layer within said mold and supported by said original layer.

In testimony whereof I hereunto affix my signature.

FLORENCE S. CROZIER.

and supported by said original layer, and adding supplemental walls to the bottom of said mold whereby the edges of said original layer are supported while setting.

6. The method of making concrete lumber units comprising forming in a bottomless mold a layer of plastic concrete, covering the top of said layer with non-adhesive material, raising the mold before said layer has set a distance not greater than the thickness of said layer plus said material, whereby the rising mold trowels the edges of said layer, then forming a new layer within said mold and supported by said original layer, adding supplemental walls to the bottom of said mold whereby the edges of said original layer are supported while setting, and in like manner adding additional layers and supplemental walls, whereby said walls trowel and support the edges of the newly formed layers.

7. The method of making concrete lumber units comprising forming in a bottomless mold a layer of plastic concrete, covering the top of said layer with non-adhesive material, raising the mold before said layer has set a distance not greater than the thickness of said layer plus said material, whereby the rising mold trowels the edges of said layer, then forming a new layer within said mold and supported by said original layer, adding supplemental walls to the bottom of said mold whereby the edges of said original layer are supported while setting, and in like manner adding additional layers and supplemental walls, whereby said walls support the edges of the newly formed layers.

8. The method of making ornamental concrete lumber units comprising forming in a bottomless mold a layer of plastic concrete, forming an ornamental face on the surface of said layer, covering the top of said layer with non-adhesive material, raising the mold a distance not greater than the thickness of said layer plus said material, and then forming a new ornamented layer within said mold and supported by said original layer.

9. The method of making ornamental concrete lumber units comprising forming in a bottomless mold a layer of plastic concrete, forming an ornamental face on the surface of said layer, covering the top of said layer with non-absorbent material, raising the mold a distance not greater than the thickness of said layer plus said material, and then forming a new ornamented layer within said mold and supported by said original layer.

In testimony whereof I hereunto affix my signature.

FLORENCE S. CROZIER.

CERTIFICATE OF CORRECTION.

Patent No. 1,657,566.   Granted January 31, 1928, to

FLORENCE S. CROZIER.

It is hereby certified that error appears in the printed specification of the above numbered patent requiring correction as follows: Page 3, line 16, for the word "unhooked" read "unhooking"; page 5, lines 50 and 54, for the word "stubbing" read "studding", and page 6, line 69, for the misspelled word "sereval" read "several"; page 8, line 107, claim 3, for "claim 40" read "claim 1"; and that the said Letters Patent should be read with these corrections therein that the same may conform to the record of the case in the Patent Office.

Signed and sealed this 21st day of February, A. D. 1928.

Seal.

M. J. Moore,
Acting Commissioner of Patents.

CERTIFICATE OF CORRECTION.

Patent No. 1,657,566. Granted January 31, 1928, to

FLORENCE S. CROZIER.

It is hereby certified that error appears in the printed specification of the above numbered patent requiring correction as follows: Page 3, line 16, for the word "unhooked" read "unhooking"; page 5, lines 50 and 54, for the word "stubbing" read "studding", and page 6, line 69, for the misspelled word "sereval" read "several"; page 8, line 107, claim 3, for "claim 40" read "claim 1"; and that the said Letters Patent should be read with these corrections therein that the same may conform to the record of the case in the Patent Office.

Signed and sealed this 21st day of February, A. D. 1928.

Seal.

M. J. Moore,
Acting Commissioner of Patents.